March 6, 1962     O. R. PETTERS     3,023,850
MODULAR TIMER Filed Feb. 18, 1959     6 Sheets-Sheet 1

FIG. 1.

INVENTOR
*Oscar R. Petters*

BY
*Diggins & Le Blanc*
ATTORNEYS

FIG. 2.

March 6, 1962     O. R. PETTERS     3,023,850
MODULAR TIMER Filed Feb. 18, 1959     6 Sheets-Sheet 3

INVENTOR
Oscar R. Petters
BY
Diggins & LeBlanc
ATTORNEYS

INVENTOR
*Oscar R. Petters*

BY *Diggins & LeBlanc*
ATTORNEYS

March 6, 1962 O. R. PETTERS 3,023,850
MODULAR TIMER

Filed Feb. 18, 1959 6 Sheets-Sheet 5

INVENTOR
Oscar R. Petters

BY Diggins & LeBlanc
ATTORNEYS

March 6, 1962  O. R. PETTERS  3,023,850
MODULAR TIMER

Filed Feb. 18, 1959                                      6 Sheets-Sheet 6

INVENTOR
*Oscar R. Petters*

BY
*Diggins & Le Blanc*
ATTORNEYS

United States Patent Office 3,023,850
Patented Mar. 6, 1962

3,023,850
MODULAR TIMER
Oscar R. Petters, Columbia, Pa., assignor to The Hamilton Watch Company, Lancaster, Pa., a corporation of Pennsylvania
Filed Feb. 18, 1959, Ser. No. 794,095
14 Claims. (Cl. 185—38)

This invention relates to a modular timer and more particularly relates to an improved modular timer consisting of a series of interchangeable modules which may be assembled together in a novel manner in a variety of combinations so as to permit a minimum stock of standard modules to perform a large variety of timing functions.

In many industrial operations, it is necessary to procure or provide different timing devices which will either drive a load at a predetermined rate or will perform a predetermined function at the end of a specified period of time. For the most part, this need has been met by the design and manufacture of individual timers specifically tailored to the particular job at hand and this individual design and manufacture has resulted in a relatively high unit cost. In the light of these circumstances, it has been apparent for some time that considerable savings could be effected and marked improvements in production time could be brought about if some type of modular timer were developed which could satisfy a large variety of timing needs through the use of varied combinations of more or less standard timer modules. At least one attempt to present such a solution to the problem has been made in the field of timing devices for driving meter charts as is evidenced by Nicholson Patent No. 2,852,907.

The approach adopted in the Nicholson patent is broadly based upon the concept of providing a basic gear train housing to which are attached interchangeable power modules, output modules, and escapement modules. The gear train housing is large enough to receive all of the foregoing modules on one surface and contains at least a pair of gear trains which are connected to drive respectively the output module and the escapement module. This same main housing has an output shaft journalled therein and this kinematically connects to the output module. Provision is made for the interchange of gears in the main housing so as to vary the ratio of drive between the power input shaft and the escapement on the one hand, and the power input shaft and the output shaft on the other hand.

While the foregoing type of modular arrangement is satisfactory in meter drives where space is generally not a problem, it is not readiy adapted to usage in a system where extreme miniaturization is necessary. In addition to this, the provision of a main housing containing an output shaft and a series of gear trains, wherein three additional modules must be mounted thereon, requires that any miniaturization of the main housing must be accompanied by a triple reduction in the size of the three modules which must be mounted thereon, a situation impossible beyond a certain fixed degree of size reduction. Further, the use of interchangeable gear trains requires that the main housing be completely disassembled at any time that a change in drive speed is desired.

According to the present invention, it has now been found that the foregoing difficulties may be avoided and a much higher degree of timer versatility achieved through a unique serial stacking of timer modules which may be individually miniaturized almost without limitation. In order to achieve this highly desirable result, there are provided a power module, a train module and an escapement module which are roughly equal in size and which are adapted to be stacked in a serial arrangement such that each individual module is capable of assuming plural mounting and driving relationships with its adjacent module. That is to say, it is an important feature of the present invention that the power module may be attached to the train module in a series of different positions so as to drive the train output gear at different speeds and in different directions. The escapement module is similarly adapted for attachment to the train module in two positions so as to be capable of proper functioning regardless of the direction of rotation of the output gear of the train module.

It is a feature of this invention that the power module itself provides both the input and the output shaft which drives any load which it is desired to attach to the power module. The input end of this shaft drives the train module which, in turn, drives the escapement module so as to regulate and control the speed of rotation of the main (output) shaft of the power module. With such an arrangement the main shaft of the power module serves in a sense as both the input and output shaft in that the speed of this shaft is regulated so that it may directly drive the output load. Since the various modules are stacked and of approximately equal size, it is possible to miniaturize each without producing impossible demands upon the miniaturization necessary in the remaining modules.

It is accordingly a primary object of the present invention to provide an improved modular timer.

It is another object of the invention to provide an improved modular timer consisting of a series of substantially equally sized modules which are connectable together in plural fashions so as to provide varied outputs from the same set of modules.

It is another object of the invention to provide an improved modular timer of the foregoing type wherein the individual modules are stacked and wherein the power module contains a shaft which acts both as the input and output shaft.

It is another object of the invention to provide an improved modular timer of the foregoing type including a power module, a train module, and an escapement module, wherein the power module may be attached to the train module in a variety of positions to achieve a variety of drives from the output of the train module.

It is another object of the invention to provide an improved modular timer of the foregoing type having a power module, train module and escapement module wherein the escapement module is adapted to attachment to the train module in a plurality of positions so as to provide control of the speed of rotation of the main shaft of the power module regardless of the direction of rotation of the output of the train module.

It is another object of the invention to provide an improved modular timer of the foregoing type wherein the train module contains a gear train having a plurality of gears adapted to engage the output gear of the power module in a variety of different ways so as to produce any one of a series of predetermined outputs.

It is still another object of the present invention to provide a modular timer of the foregoing type wherein the total space occupied by the timer is constant regardless of the manner in which the individual modules are attached to one another.

It is another object of the present invention to provide an improved modular timer susceptible of extreme miniaturization.

It is still another object of the present invention to provide an improved modular timer capable of performing a large variety of timing functions with a minimum of parts.

These and further objects and advantages of the invention will become more apparent upon reference to the following specification, claims and appended drawings wherein:

Figure 1:
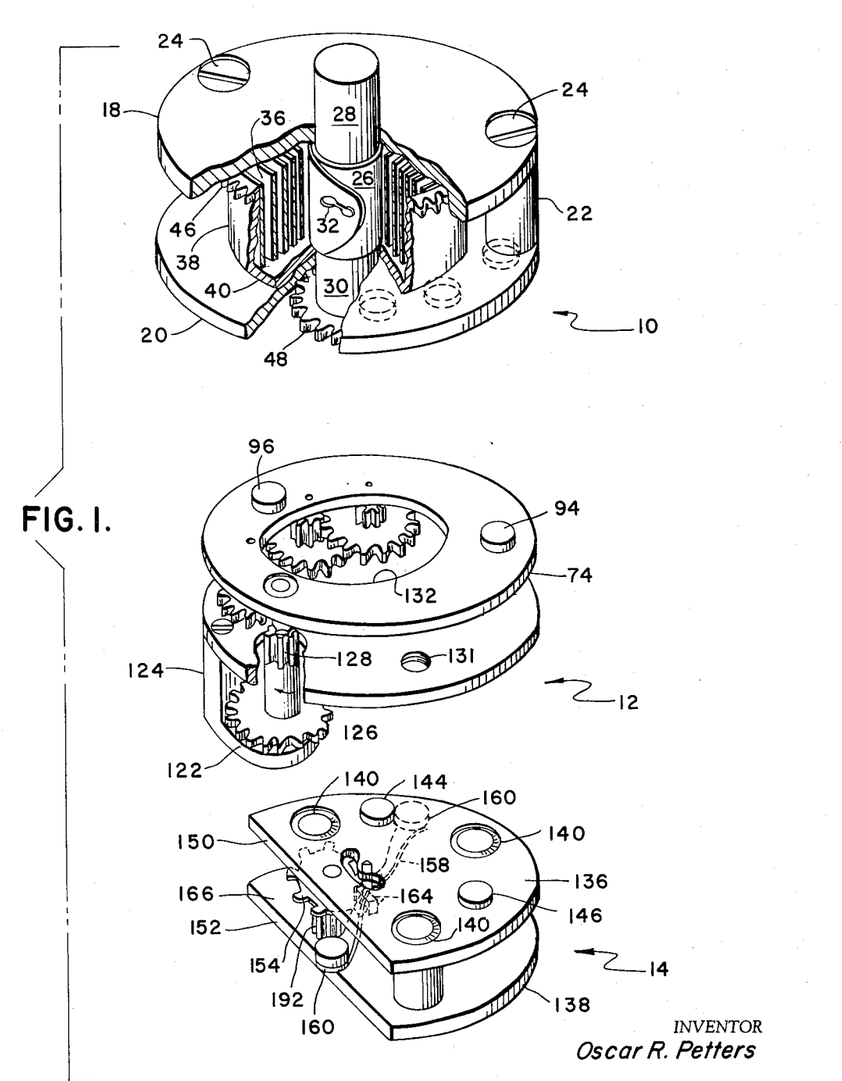
FIGURE 1 is an exploded perspective view, partly in section, showing representative power, train and escapement modules in stacked arrangement.
Figure 2:
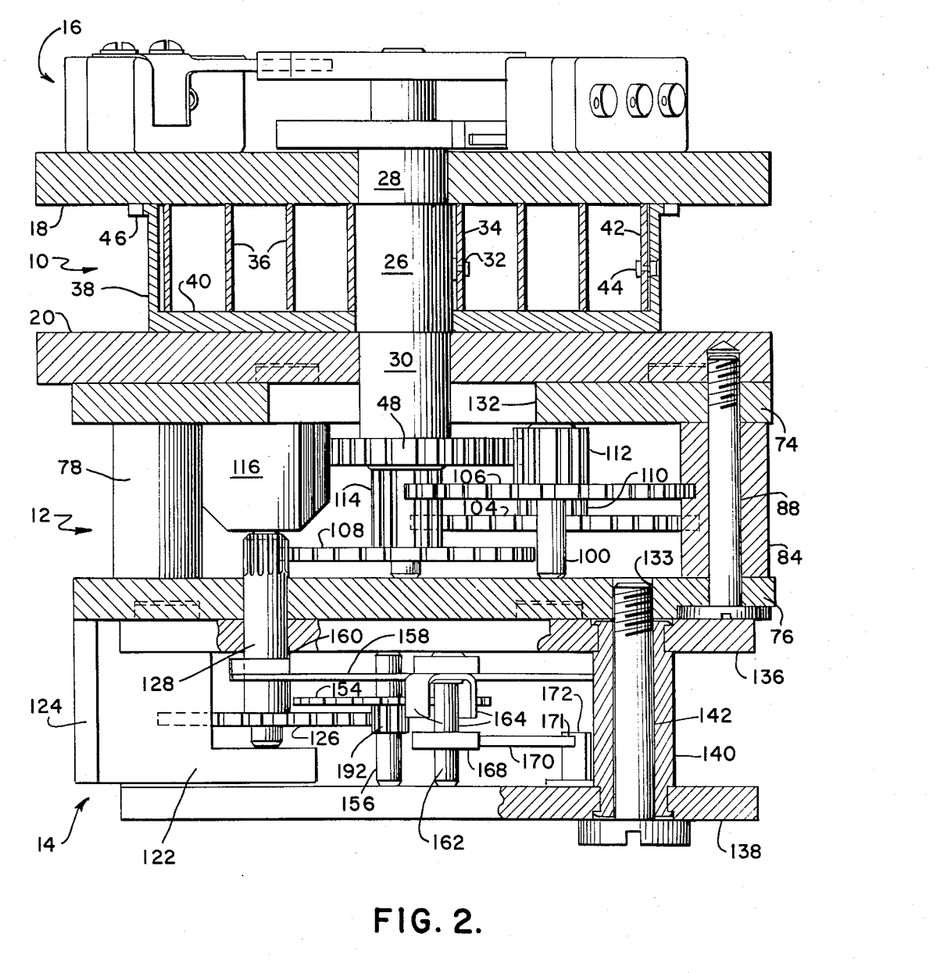
FIGURE 2 is a vertical section showing the power, train and escapement modules mounted in operative arrangement and driving a representative output module or load.

Referring more particularly to FIGURES 1 and 2 of the drawing, the modular timer of this invention comprises a power module 10, a train module 12 and an escapement module 14. These units are adapted to be stacked and the output shaft of the power module may drive any desired load such as a switching or camming module indicated generally at 16 in FIGURE 2 or, alternatively, may drive a time indicating or chart mechanism. Each of the individual modules is adapted to substitution and the modules shown in FIGURE 1, by way of example, may be assembled together in varying ways to produce a variety of outputs from the output shaft. In order to facilitate a full understanding of the overall unit, each of the modules will now be described in detail.

*Power Module*

Figure 3:
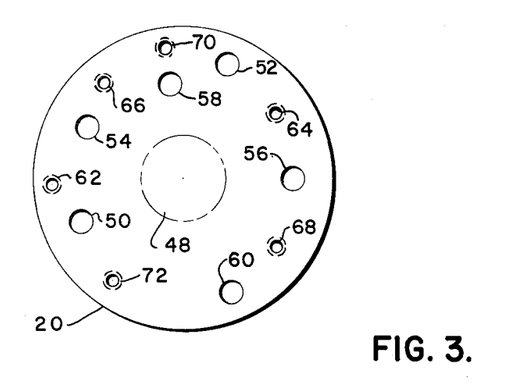
FIGURE 3 is an underside plan view of the power module showing the guide and screw holes.

Referring to FIGURES 1, 2 and 3, the power module 10 comprises a pair of circular plates 18 and 20 which are secured to one another in parallel spaced relation by means of a pair of posts 22 and screws 24. Journalled in the plates 18 and 20 is a main shaft 26 having reduced diameter ends 28 and 30 which extend beyond the outer faces of the plates 18 and 20. The shaft 26 carries a stud 32 which engages the inner end 34 of a spiral main spring 36. The main spring 36 is received within a cylindrical barrel 38 having a bottom 40 which is journalled on the main shaft 26. The outer end 42 of the main spring 36 is secured to the barrel 38 by means of a stud 44.

The upper periphery of the barrel has an outwardly extending flange which is cut to form a gear 46 intended to mate with a suitable winding gear. That is to say, the entire timer is adapted to be cradled in a suitable attachment which contains a winding gear which engages the gear 46 on barrel 38 to wind the main spring in a manner which will be understood by those skilled in the art. A click of conventional clock type is provided to prevent unwinding of the barrel. The lower end 30 of main shaft 26 has a power gear 48 attached thereto lying below the outer surface of plate 20.

Referring to FIGURE 3, there is shown an underside view of the power module with the power gear 48 indicated in phantom and showing certain openings in the lower plate 20. Three pairs of guide bores 50—52, 54—56 and 58—60 are provided and the spacing between the bores in each set of guide bores is identical and is intended to key the power module to the train module in a manner which will be explained in further detail hereinafter. The plate 20 also contains three corresponding pairs of screwthreaded mounting holes 62—64, 66—68 and 70—72. The spacings between the holes in each of these pairs are also identical and these screwthreaded holes are provided in order to secure the power module to the train module in a manner which will become more apparent hereinafter.

*Train Module*

Figure 5:
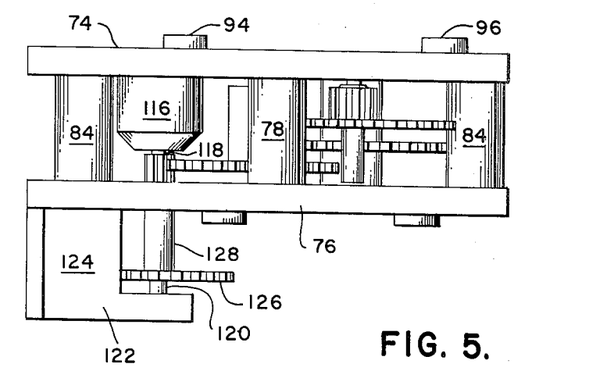
FIGURE 5 is a vertical elevation of the train module.

The train module 12 comprises a pair of parallel spaced plates 74 and 76 which are fastened together by means of a pair of posts 78 and rivets 80, although it is to be understood that screws may be used for this purpose, if so desired. The heads of the rivets 80 are received in recesses 82, so that the rivet heads are flush with the surfaces of the plates 74 and 76. A second pair of posts 84 is carried between the plates 74 and 76 and these plates are bored at 86 to receive screws 88 which are adapted to enter the screwthreaded openings 62—64, 66—68 and 70—72 in the lower plate 20 of the power module 10 to fasten the train module to the power module. The heads 90 of the screws 88 are received in counterbored recesses 92 in the underside of plate 76 so as to be flush with the surface thereof. A pair of guide pins 94 and 96 are provided on the top of the upper plate 74 as is seen in FIGURE 5 and are spaced the same distance as the spacing between the respective pairs of guide bores 50—52, 54—56 and 56—60 in the lower plate 20 of the power module for keying engagement therewith.

Figure 4:
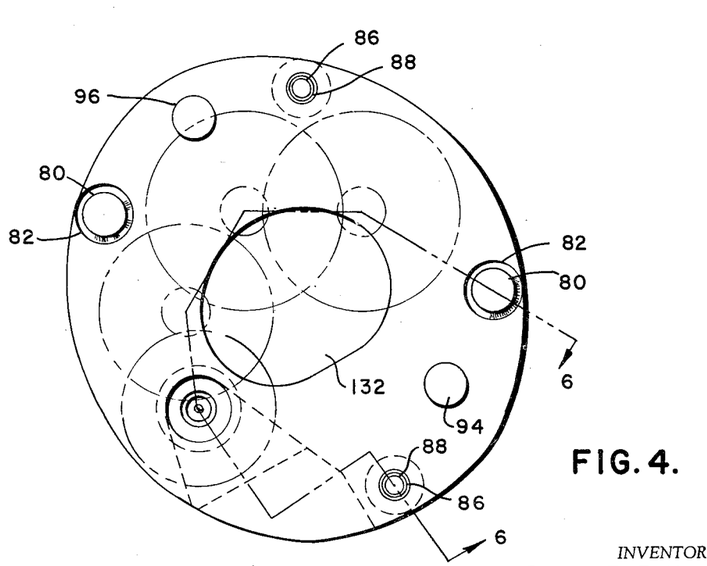
FIGURE 4 is a plan view, partially diagrammatic, showing the arrangement of the gears in the train module.
Figure 6:
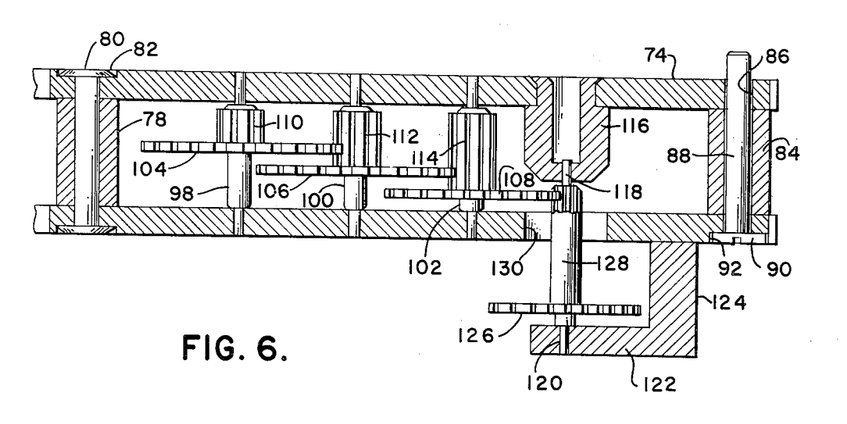
FIGURE 6 is a vertical section of the train module taken on the bent line 6—6 in FIGURE 4.

Journalled between the plates 74 and 76 of the train module are a series of shafts 98, 100 and 102, best seen in FIGURE 6. These shafts carry a series of gears 104, 106 and 108 which are respectively attached to pinions 110, 112 and 114. Gear 104 on shaft 98 engages pinion 112 while gear 106 on shaft 100 engages pinion 114, so that the gears 104, 106 and 108 constitute a train. The upper plate 74 has staked thereto a bearing post 116 which receives one end 118 of a further shaft. The lower end 120 of this shaft is received in an arm 122 carried by a post 124 secured to the plate 76 in any suitable manner such as by screws. The shaft 118—120 carries a drive gear 126 and attached pinion 128, which meshes with the gear 108 on shaft 102. Pinion 128 passes through a suitable opening 130 in plate 76 so that the drive gear 126 is disposed below the surface of that plate. Referring to FIGURES 1 and 4, the upper plate 74 in the train module is cut away at 132 to receive the power gear 48 at the bottom of the main shaft 26 of the power module. As will be explained in further detail hereinafter, this power gear is adapted to drivingly engage any one of the pinions 110, 112 or 114.

Figure 7:
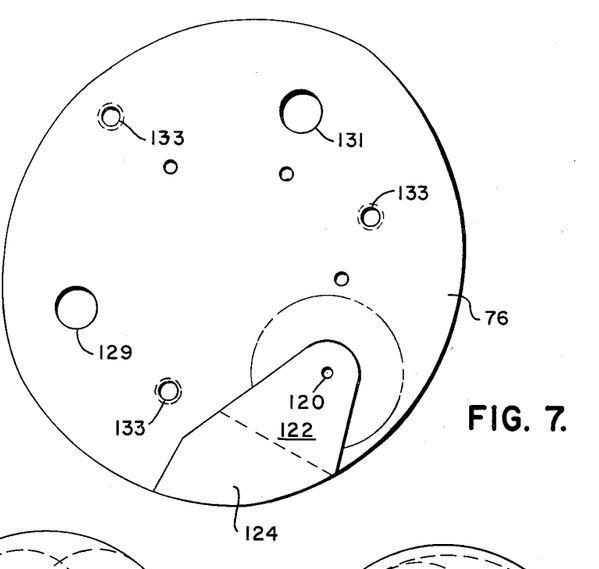
FIGURE 7 is an underside plan view of the train module.

Referring to FIGURE 7, the lower plate 76 in the train module is provided with a pair of guide bores 129—131 which are adapted to key the train module to the escapement module as presently will be described in further detail. The lower plate 76 is also provided with screwthreaded holes 133 which are adapted to secure the train module to the escapement module.

*Escapement Module*

The escapement module illustrated in the drawings comprises a Junghans type escapement, although it is to be understood that other types of escapements such as clutter-type, pallet and lever, etc., may be used.

Referring to FIGURES 1, 2, 11 and 12, the escapement module 14 comprises a pair of spaced parallel plates 136 and 138 which are fastened together by means of hollow rivets 140 which are recessed into the plates so that the plates present a smooth surface. The hollow rivets 140 are adapted to receive screws 142 which enter the screwthreaded holes 133 in the plate 76 of the train module to secure the escapement module thereto as is best seen in FIGURE 2. A pair of guide pins 144 and 146 are carried by the plate 136 for keying engagement with the guide bores 129 and 131 in the lower plate 76 of the train module.

Referring to FIGURE 1, the left sides of the circular plates 136 and 138 are chordally truncated to form flat edges 150 and 152. A Junghans escapement wheel 154 is pivoted between the plates on a staff 156. An oscillating bar 158 carrying weights 160 is pivoted on a staff 162 which extends between the plates 136 and 138. This bar is provided with conventional depending fingers 164 which engage the teeth 166 of the escapement wheel 154 as the bar oscillates and regulates the speed of rotation of the escapement wheel 154 in a well known manner.

Figure 12:
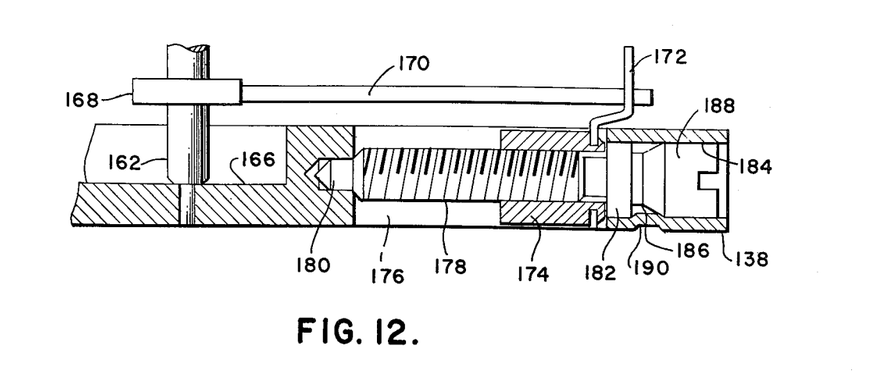
FIGURE 12 is a partial vertical section of the escapement module taken along the line 12—12 of FIGURE 11.

Referring to FIGURE 12, the lower plate 138 is recessed at 166 and the staff 162 of the oscillating bar 158 carries a collet 168 to which one end of an elongated spring 170 is attached. The other end of the spring 170 is received in a slot 171 (FIGURE 2) in an upstanding lug 172 which is affixed to a nut 174 mounted in a slot 176 in the lower plate 138. The nut 174 is screwthreadedly mounted on a screw 178 which extends longitudinally through the slot 176 and has one end 180 journalled in the lower plate 138 at the inner end of the slot 176.

The other end of the screw 178 is provided with a cylindrical portion 182 received in a bore 184 in the plate 138. An annular groove 186 lies adjacent the cylindrical portion 182 and separates it from the screwhead 188. The undersurface of the plate 138 is struck inwardly at 190 so as to enter the groove 186 to lock the screw 178 in position in the plate 138 while still permitting its rotation. As will be understood by those skilled in the art, rotation of screw 188 moves the nut 174 along the screw to move the lug 172 and thereby change the effective length of the spring 170 to adjust the rate of the escapement.

Mounted immediately below the escapement wheel 154 in FIGURE 1 is a pinion 192 which is adapted to engage the drive gear 126 of the train module 12 when the escapement module 14 is affixed thereto and positioned thereon by the guide pins 144 and 146. While not shown in FIGURE 1, the lower plate 138 also has guide pins corresponding to pins 144 and 146 mounted on the lower surface thereof, so that the escapement module is attachable to the train module in either of two positions and the drive gear 126 of the train module is adapted to engage the escapement pinion 192 in both of these positions in order to permit the escapement to control the rate of rotation of the train module regardless of the direction of rotation of the train drive gear 126.

*Assembly*

Referring now to FIGURE 2, the power module 10 is mounted on the train module 12 and secured thereto by means of screws 88 passing through the train module. The power gear 48 of the power module extends through the opening 132 in the train module and engages one of the pinions 110, 112 or 114. The escapement module 14 is secured to the underside of the train module 12 by means of screws 142. The drive gear 126 of the train module engages the pinion 192 of the escapement wheel 154, the shaft 128 bearing the train output gear 126 extending down past the flat edges 150 and 152 of the plates 136 and 136 of the escapement module 14. The entire modular timer thus assembled may have assembled to the main shaft 26 some output device such as a switching or camming module 16 as indicated in FIGURE 2. After winding the main spring 36 the main shaft 26 rotates at a speed determined by the escapement module and by the gearing in the train module.

Figure 8:
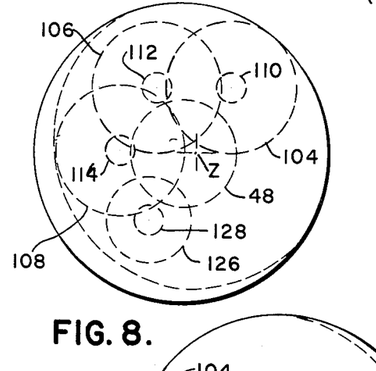
FIGURE 8 is a diagrammatic view of the train module showing the output gear of the power module engaged in a manner permitted by one position of attachment of the power and train modules.

The design of the modular timer of this invention is such as to permit the selection of three gear train combinations from one basic gear train by indexing the power gear of the power module into engagement with different pinions in the train module. Referring to FIGURE 8, the power gear 48 of the train module is shown engaged with pinion 114 to estabilsh an active gear train from the power gear 48 to gear 108, pinion 128 and drive gear 126 to the escapement. Gears 106 and 104 are floating gears in this case.

If a different gearing ratio is desired, the power module may be indexed in relation to the train module about the point Z so as to bring different guide bores 50—52, 54—56, and 56—60 in the lower plate 20 of the power module into positioning engagement with the guide pins 129 and 131 on the upper plate 74 of the train module.

Figure 9:
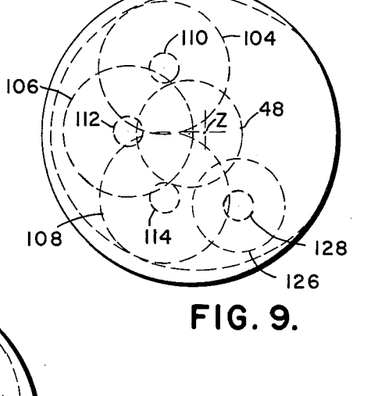
FIGURE 9 is a diagrammatic view of the train module showing the drive gear of the power module engaged according to another position of attachment of the power and train modules.

Referring to FIGURE 9, the power gear 48 may be indexed in this manner so as to mesh with pinion 112 and thereby establish an active gear train from power gear 48 through pinion 112, gear 106, pinion 114, gear 108, pinion 128 and drive gear 126 to the escapement. The gear 104 in this instance is a floating gear.

Figure 10:
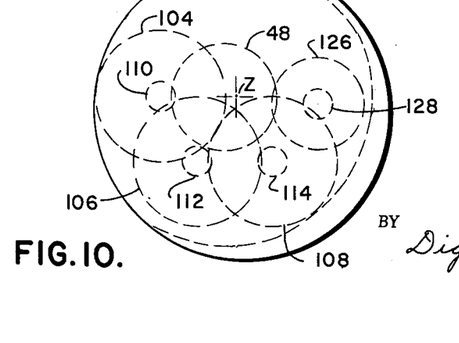
FIGURE 10 is a diagrammatic view of the train module showing the output gear of the power module engaged according to still another position of attachment of the power and train modules.
Figure 11:
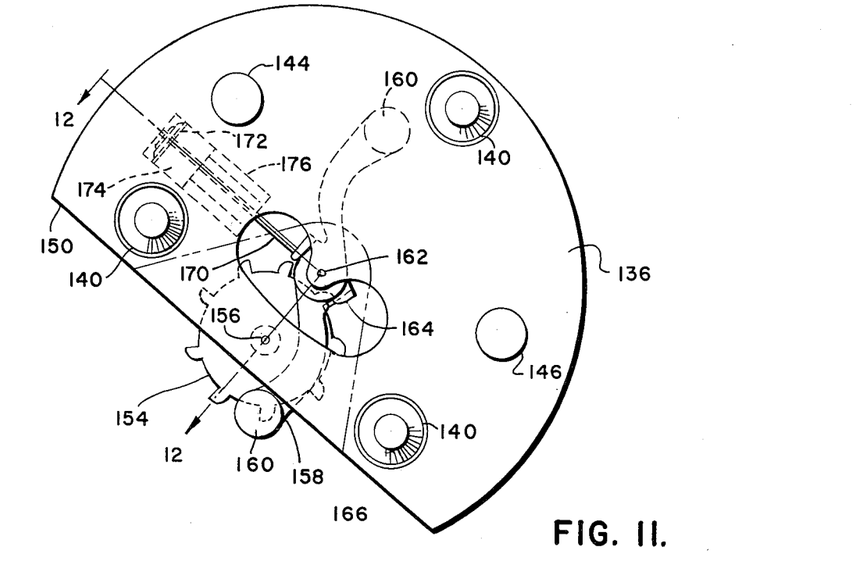
FIGURE 11 is a plan view of one type of escapement module adapted for use with the timer of the invention.

Referring to FIGURE 10, the power gear 48 is shown further indexed about the point Z to mesh with pinion 110. This establishes an active gear train from the power gear 48 through pinion 110, gear 104, pinion 112, gear 106, pinion 114, gear 108, pinion 128 and drive gear 126 to the escapement. There are no floating gears in this particular arrangement.

By means of these three different index positions, it is possible to obtain three different gearing combinations as follows:

(1) 48—114—108—126.
(2) 48—112—106—114—108—128—126.
(3) 48—110—104—112—106—114—108—128—126.

From the plan views of FIGURES 8, 9 and 10, it is to be noted that the outer shape of the power module is circular while the outer shape of the train module is elliptical. With such a design, the maximum outer diameter of all modules is never greater than the diameter of the power module thereby facilitating standard mounting of the modular timer in associated equipment despite indexing changes between the power and train modules.

It will be appreciated that as the power gear 48 is meshed with different pinions in the train module, the direction of the rotation of the train drive gear 126 changes. By reason of the novel mounting of the escapement module, however, this presents no problem since it is merely necessary to invert the escapement module to provide for effective escapement action regardless of the direction of rotation of the output gear in the train module.

While it is an important feature of the instant invention that a plurality of gearing combinations may be provided between the power module and the escapement by simply indexing the power module relative to the train module, it will also be obvious that even further changes in gearing ratios might be obtained by substituting different gears for those shown in the figures of the drawing. Similarly, while a spring-driven power module is illustrated, it is possible and is intended to utilize the timer with electrically, pneumatically or mechanically-driven power modules as the particular installation may require. The escapement module is also adapted to substitution by equivalent lever and pallet or clutter escapement as will be well understood by those skilled in the art.

The modular timer is thus capable of a wide adaptability to performing varying timing functions through the use of an absolute minimum number of standard parts. Any given assemblage of power module, train module and escapement module is capable of performing a plurality of timing functions by simply indexing the power module relative to the train module and inverting the escapement module relative to the train module without the necessity for substituting gears or parts in any of the modules of the timer. The three modules are adapted for stacked mounting which permits the modules to be roughly equivalent in size so as to provide maximum opportunity for miniaturization. The output of the modular timer is taken direct from the power module without the necessity of first passing this driving power through the train module. While the indexability of the various modules provides a versatility without the substitution of modules, it will be apparent that substitution of train modules or gear trains therein may be resorted to to provide still further versatility. A power module may be spring driven, pneumatically driven, electrically or otherwise driven while the escapement module may be of any selected type.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A modular timer comprising a train module containing a series of gears constituting a gear train, a power module containing a source of motive power and haivng a power gear, said power module being mountable on said train module in any one of a plurality of positions, said power gear engaging a different gear in said gear train in each mounting position of said power module, and an escapement module attached to said train module and kinematically connected thereto to determine the rate of rotation of said gear train.

2. A modular timer as set out in claim 1 wherein the movement of said power module into one of said plurality of positions comprises a rotation of said power module relative to a fixed point on said train module.

3. A modular timer as set out in claim 2 wherein said power and train modules are generally disc shaped and of the same general size, said power module being circular and said train module being elliptical, the diameter of said power module being at least as large as the maximum diameter of said train module so that said train module lies within the periphery of said power module in each of said positions.

4. A modular timer as set out in claim 2 wherein said escapement module is generally disc shaped and attachable to said train module in either of two conjugate positions to regulate the rate of said gear train in two directions of rotation.

5. A modular timer as set out in claim 2 wherein said power module has an output shaft extending therefrom in a direction away from said train module.

6. A modular timer comprising a train module containing a series of gears constituting a gear train, a power module containing a source of motive power and having a power gear, said power module being mountable on said train module in any one of a plurality of positions, said power gear engaging a different gear in said gear train in each mounting position of said power module, and an escapement attachable to said train module in either of two conjugate positions to regulate the rate of said gear train in two directions of rotation.

7. A modular timer comprising a generally disc shaped train module containing a series of gears constituting a gear train, a generally disc shaped power module containing a source of motive power and having a power gear, said power module being mountable on said train module in any one of a plurality of relatively rotated positions, said power gear engaging a different gear in said gear train in each of said positions of said power module, and an escapement module attached to the opposite side of said train module from said power module and kinematically connected thereto to determine the rate of rotation of said gear train.

8. A modular timer as set out in claim 7 wherein said escapement module is generally disc shaped and attachable to said train module in either of two conjugate positions to regulate the rate of said gear train in two directions of rotation.

9. A modular timer as set out in claim 8 wherein said power module has an output shaft extending therefrom in a direction away from said train module.

10. A modular timer comprising generally flat power train, and escapement modules assembled together in stacked relation with the train module between the power and escapement modules and kinematically connecting said modules together, said power module having an output shaft extending therefrom in a direction away from said train module, said power module being attachable to said train module in any one of a plurality of positions so that said escapement module causes said output shaft to rotate at different speeds when said power module is attached to said train module in said different positions.

11. A modular timer comprising a train module containing a series of gears constituting a gear train, a power module containing a source of motive power and having a power gear, said power module mounted on said train module in a first position so that said power gear engages one of said gears in said gear train, means for mounting said power module on said train module in a plurality of other positions, said power gear engaging a different gear in said gear train in each of said other positions, and an escapement module attached to said train module and kinematically connected thereto to determine the rate of rotation of said gear train.

12. A power module for use in a modular timer comprising a pair of parallel end plates, a shaft journalled in said end plates, a barrel mounted between said end plates, a spring located in said barrel and having one end connected to said shaft and the other end connected to said barrel, a gear mounted on said shaft exterior of one of said end plates, and a plurality of means associated with said one end plate for cooperating with other modules of said modular timer.

13. A train module for use in a modular timer comprising first and second parallel end plates, a plurality of shafts journalled in said end plates, each of said shafts having a pinion and a gear mounted thereon, said pinions being of unequal axial length, said pinions and said gears cooperating to form a gear train, means depending from said second end plate, shaft means journalled in said depending means, a pinion and gear carried by said shaft means, said last gear of said gear train meshing with said pinion carried by said shaft means, means associated with said first end plate for cooperating with other modules of said modular timer, and means associated with said second end plate for cooperating with other modules of said modular timer.

14. An escapement module for use in a modular timer comprising first and second parallel end plates, each of said end plates having a chordally truncated portion, a shaft journalled in said end plates adjacent said truncated portions, a pinion mounted on said shaft, an escapement wheel mounted on said shaft, escapement means located between said end plates for regulating the movement of said escapement wheel, and means associated with each of said first and second end plates for cooperating with other modules of said modular timer.

References Cited in the file of this patent

UNITED STATES PATENTS

| | | | |
|---|---|---|---|
| 259,859 | Hotchkiss | | Jun. 20, 1882 |
| 432,418 | Martin et al. | | Jul. 15, 1890 |
| 2,596,819 | Murphy | | May 13, 1952 |
| 2,661,815 | McGay | | Dec. 8, 1953 |

FOREIGN PATENTS

| | | | |
|---|---|---|---|
| 3,296 | Great Britain | | 1909 |